United States Patent [19]

Aoki et al.

[11] Patent Number: 4,562,345
[45] Date of Patent: Dec. 31, 1985

[54] METHOD AND APPARATUS FOR DETECTING FOCUS CONDITIONS OF A PHOTOGRAPHIC OPTICAL SYSTEM

[75] Inventors: Masahiro Aoki, Tokyo; Junichi Nakamura; Masatoshi Ida, both of Hachioji; Kenichi Oinoue, Tokyo; Asao Hayashi, Hachioji, all of Japan

[73] Assignee: Toyota Jidosha Kabushiki Kaisha, Toyota, Japan

[21] Appl. No.: 448,038

[22] Filed: Dec. 8, 1982

[51] Int. Cl.$^4$ .............................................. G01J 1/20
[52] U.S. Cl. ..................... 250/201; 250/204; 354/407
[58] Field of Search ............ 250/201 PF, 204; 354/406–409

[56] References Cited

U.S. PATENT DOCUMENTS

| | | | |
|---|---|---|---|
| 4,230,401 | 10/1980 | Tokutomi et al. | 354/409 |
| 4,352,545 | 10/1982 | Uno et al. | 354/406 |
| 4,492,449 | 1/1985 | Oinue et al. | 354/407 |

Primary Examiner—David C. Nelms
Assistant Examiner—J. Gatto
Attorney, Agent, or Firm—Parkhurst & Oliff

[57] ABSTRACT

A method and apparatus for detecting focus conditions of a photographic optical system is disclosed. The invention comprises a member for dividing the wavefront of a light beam from a photographic optical system in an image space thereof, a first light receiving device including two photocell arrays provided in the front and the rear of a surface conjugated to a predetermined focal plane of the optical system, and a second light receiving device including at least one photocell array provided at a surface conjugated to one of the photocell arrays in the first light receiving device. A first signal representing horizontal shift of an optical image is detected based on outputs of at least one photocell array in the second light receiving device and one photocell array in the first light receiving device having a relation conjugated to the photocell array in the second light receiving device. A second signal representing defocused amount of the image is detected based on outputs of two photocell arrays in the first light receiving device thereby detecting focus conditions by the first and the second signals.

11 Claims, 15 Drawing Figures

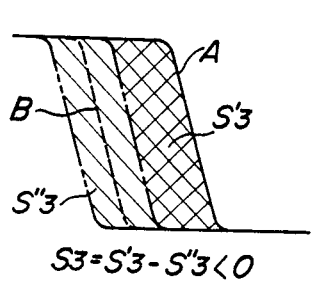
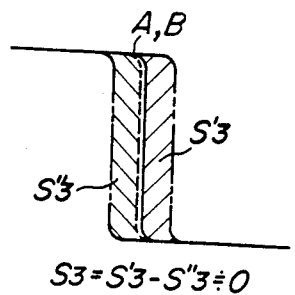
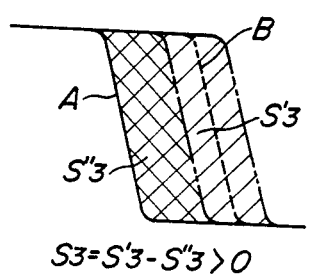
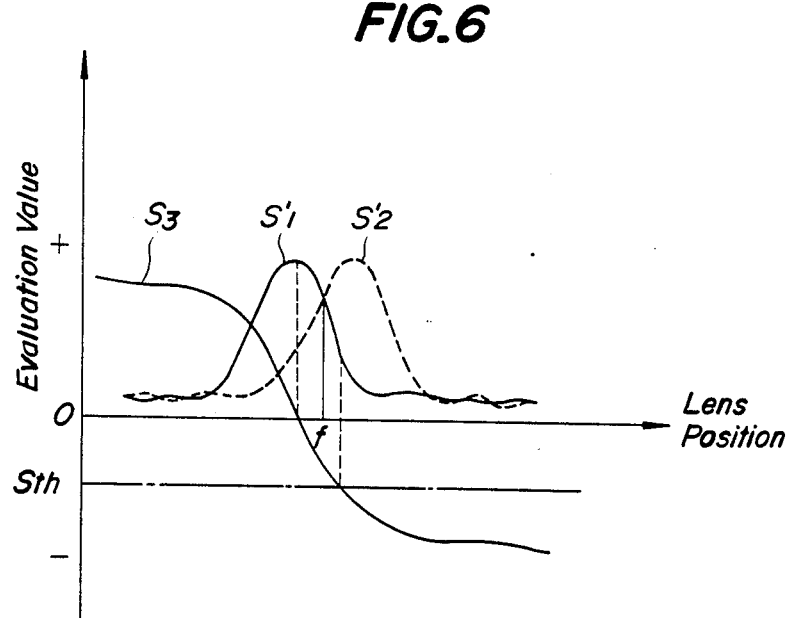

METHOD AND APPARATUS FOR DETECTING FOCUS CONDITIONS OF A PHOTOGRAPHIC OPTICAL SYSTEM

BACKGROUND OF THE INVENTION

The present invention relates to a method of detecting focus conditions for use in a still camera, a cinecamera, a single-lens reflex camera, a photomicrography taking device or the like and a device for carrying out the method.

Various systems for detecting focus conditions have been proposed. For example, a defocused detecting system exists which utilizes an evaluation function for calculating defocused amount (sharpness) of the image. FIG. 1 shows a construction of a focus condition detecting device for the single-lens reflex camera adopting such a defocused image detecting system. The light beam from an object lens 1 is divided in part or in whole into two parts by a quick return mirror 2. One of the divided beams is led to a finder system (not shown) and the other of the dividing beams is led to a beam splitter 4 by a total reflection mirror 3 which is arranged on the rear surface of the mirror 2. This latter divided beam is further divided into two parts by the beam splitter 4. These latter divided beams are projected onto two accumulative type light receiving element arrays 5 and 6 such as photocell arrays, for example, CCD, PDA or the like. So as to form a predetermined optical path difference in the optical axis direction, photocell arrays 5 and 6 are equidistantly arranged in the front and the rear of a plane conjugated to a film surface thereby forming an image corresponding to the position in the optical axis direction of the lens 1 onto these photocell arrays. Outputs photoelectrically converted by the photocell arrays 5 and 6 are analog/digital (A/D) converted by an A/D conversion circuit 7 and arithmetically operated upon by a central processing unit (CPU) 8 based on a predetermined evaluation function which calculates sharpness of image. This results in respective evaluation values corresponding to a decision of focus conditions such as front focus, in-focus and rear focus. As the evaluation function, if the output of the ith element of a photocell array is $X_i$, a sum of the maximum value $|X_i - X_{(i-1)}|_{max}$ of, for example, $|X_i - X_{(i-1)}|$ and the next largest value $|X_i - X_{(i-1)}|_{submax}$ is utilized.

FIG. 2 shows a relation between the position of lens 1 and respective evaluation values obtained by arithmetically operating upon the outputs of photocell arrays 5 and 6 utilizing the evaluation function $S = |X_i - X_{(i-1)}|_{max} + |X_i - X_{(i-1)}|_{submax}$. Solid line $S_1$ shows an evaluation value obtained from photocell array 5 and broken line $S_2$ shows an evaluation value obtained from the photocell array 6. Respective evaluation values $S_1$ and $S_2$ of photocell arrays 5 and 6 have maximum value when in-focused condition is obtained on each photocell array and evaluation values of both photocell arrays are equal to each other when in-focused condition is obtained on the film surface. Respective evaluation values $S_1$ and $S_2$, therefore, are obtained at any position of the lens 1 and compared with each other thereby deciding the rear focus condition in the case of $S_1 > S_2$, the in-focused condition in the case of $S_1 = S_2$, and the front focus condition in the case of $S_1 < S_2$, so that manual or automatic focus adjusting can be performed according to the decided result.

The above conventional focus condition detecting device can perform focus condition detecting with high precision by a comparatively simple optical system. But as seen from FIG. 2 the range in which evaluation values $S_1$ and $S_2$ are changed is remarkably narrow, and thus in the region that the lens 1 is remarkably separated from the in-focused position, evaluation values $S_1$ and $S_2$ are scarcely changed and become substantially equal to each other so that the region within which a focus condition can be properly detected becomes narrow and the detection of defocused direction is impossible.

SUMMARY OF THE INVENTION

It is an object of the present invention to overcome the above described disadvantages of the conventional focus condition detecting method.

It is another object of the present invention to provide a focus condition detecting method capable of detecting defocusing direction over wide defocus range and of detecting correct focus condition with high precision.

It is a further object of the present invention to provide a focus condition detecting device for carrying out the method according to the present invention.

According to the present invention there is provided a method of detecting focus conditions comprising dividing the wavefront of a light beam from a photographic optical system in an image space thereof, providing first light receiving means including two photocell arrays in the front and the rear of a surface conjugated to a predetermined focal plane of the optical system, providing second light receiving means including at least one photocell array at a surface conjugated to one of the photocell arrays in the first light receiving means, detecting a first signal representing horizontal shift of an image based on outputs of at least one photocell array in the second light receiving means and one photocell array in the first light receiving means having a conjugated relation to the above at least one photocell array in the second light receiving means, and detecting a second signal representing defocused amount of the image based on outputs of two photocell arrays in the first light receiving means, whereby focus conditions of the optical system are detected by the first and the second signals.

According to the present invention there is also provided a device for detecting focus conditions comprising means for dividing the wavefront of a light beam from a photographic optical system in an image space thereof, first light receiving means including two photocell arrays provided in the front and the rear of a surface conjugated to a predetermined focal plane of the optical system, second light receiving means including at least one photocell array provided at a surface conjugated to one of the photocell arrays in the first light receiving means, and means for detecting and treating a first signal representing horizontal shift of an image and a second signal representing defocused amount of the image based on outputs of proper combinations of photocell arrays in the first and second light receiving means, whereby focus conditions of the optical system are detected by the first and the second signals.

The wavefront dividing means comprises a glass plate and a total reflection film provided on the surface of the glass plate over a half region thereof thereby forming a reflection part and a transparent part.

BRIEF DESCRIPTION OF THE DRAWINGS

FIGS. 5a, 5b and 5c are explanatory views showing positional relation for output patterns of photocell arrays which are placed in a conjugate relation;

FIG. 6 is a graph explaining operation of the device shown in FIG. 3;

DESCRIPTION OF THE PREFERRED EMBODIMENT

Figure 3:
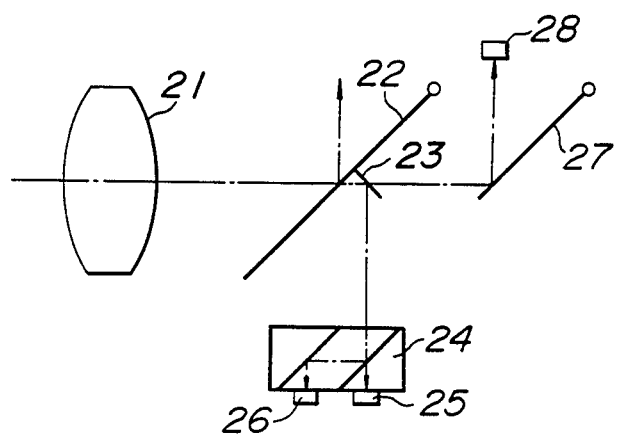
FIG. 3 is a schematic diagram showing construction of one embodiment of an optical system of a focus condition detecting device according to the present invention.

FIG. 3 shows construction of one embodiment of an optical system of the device for carrying out a method of detecting focus conditions according to the present invention. In this embodiment, a light beam from an objective lens 21 is divided into two parts by a quick return mirror 22, a center portion or the whole of which is formed by a half mirror. One part of the divided beam is led to a finder system (not shown), and the other part of the divided beam is led to a wavefront splitting element 23 which is provided at the rear side of the quick return mirror 22, thereby dividing the incident wavefront.

Figure 1:
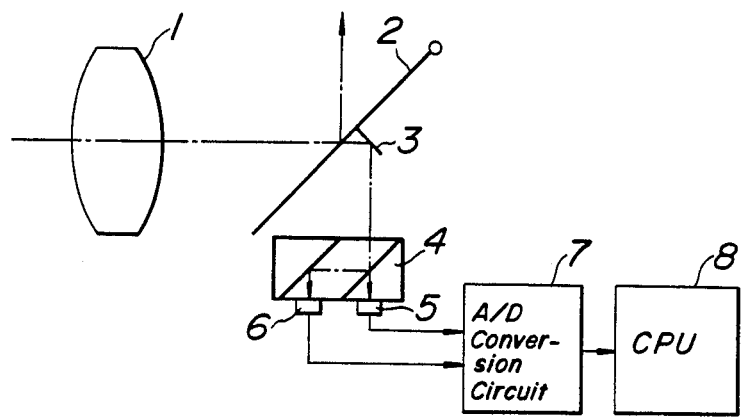
FIG. 1 is a schematic view showing construction of a conventional focus condition detecting device.
Figure 2:
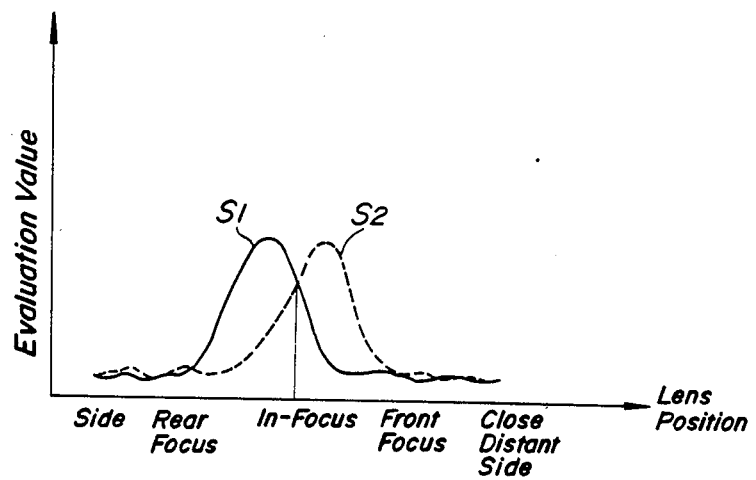
FIG. 2 is a graph showing a characteristic curve of evaluation values explaining operation of the device shown in FIG. 1.
Figure 4A:
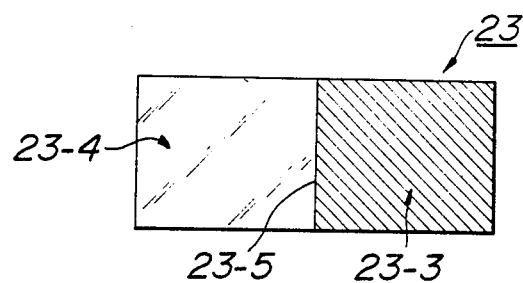
FIGS. 4a and 4b are a plan view and a side view illustrating construction of the wavefront splitter shown in FIG. 3.
Figure 4B:
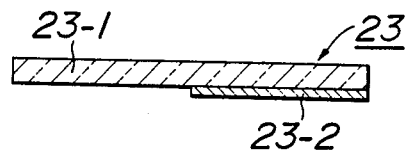

As shown in FIGS. 4a and 4b the wavefront splitting element 23 is so formed that substantially a half region of one surface of a glass plate 23-1 is provided with a total reflection film 23-2 thereby forming a reflecting part 23-3 and a transparent part 23-4. A boundary line 23-5 of the reflecting part 23-3 and the transparent part 23-4 intersects with an optical axis. The wavefront reflected by the reflecting part 23-3 of the wavefront splitting element 23 is passed through a beam splitter 24. The split wavefront is made incident on arrays of light receiving elements 25 and 26 such as photocells which are placed equidistantly on the front and the rear of a surface of beam splitter 24 conjugated to a film surface in the same manner as in FIG. 1. The wavefront transmitted through the transparent part 23-4 of the wavefront splitting element 23 is made incident on an array, such as a photocell array, of light receiving element 28, through a total reflection mirror 27 which withdraws from the photographing light path in synchronization with the quick return mirror 22 in the case of photographing. The photocell array 28 is placed at a position conjugated to the photocell arrays 25 and 26.

In FIG. 3, provided that the photocell array 28 is placed in a position conjugated to the photocell array 25, the output photoelectrically converted by the photocell arrays 25 and 28, for example, is so generated that when the focal position of the lens 21 is positioned at the rear side of the photocell array 25 due to an effect of wavefront splitting, for example, as shown in FIG. 5a the output pattern A (solid line) of the photocell array 25 is shifted right or the output pattern B (dotted line) of the photocell array 28 is shifted left; when the focal position of the lens 21 is positioned on the photocell array 25, as shown in FIG. 5b, respective output patterns A and B of the photocell arrays 25 and 28 coincide with each other in phase; and when the focal position of the lens 21 is positioned at the front side of the photocell array 25, as shown in FIG. 5c, the horizontal shifting direction of output patterns A and B of photocell arrays 25 and 28 are inverted from the case shown in FIG. 5.

Provided that the number of elements of the photocell arrays 25 and 28 is N, nth output of the photocell array 25 is $X_A$, and n−1th output of the photocell array 28 is $X_{B(n-1)}$, the following relation is obtained:

$$S'_3 = \sum_{n=2}^{N} |X_{An} - X_{B(n-1)}|$$

In FIG. 5, this equation results in a hatched area with a slope down on the left side in the case of shifting the output B of the photocell array 28 by one element to the right side.

Provided that n+1th output of photocell array 28 is $X_{B(n+1)}$, the following relation is obtained:

$$S''_3 = \sum_{n=1}^{N-1} |X_{An} - X_{B(n+1)}|$$

In FIG. 5, this equation results in a hatched area with a slope down on the right side in the case of shifting the output B of the photocell array 28 by one element to the left side.

Considering now the evaluation value $S_3 = S'_3 - S''_3$, in the case shown in FIG. 5a, the hatched area $S''_3$ with a slope down on the left side becomes larger than in the case of shifting the output B of the photocell array 28 to the left side so that evaluation value $S_3$ becomes negative. In the case shown in FIG. 5c, the hatched area $S'_3$ with a slope down on the right side becomes larger than in the case of shifting the output B of the photocell array 28 to the right side so that evaluation value $S_3$ becomes positive. In the case shown in FIG. 5b, hatched areas $S'_3$ and $S''_3$ become equal to each other so that evaluation values $S_3$ becomes a zero.

Provided that nth output of photocell array 26 is $X_{Cn}$, the evaluation value is as follows:

$$S'_1 = |X_{An} - X_{A(n-1)}|_{max} + |X_{An} - X_{A(n-1)}|_{submax}$$

$$S'_2 = |X_{Cn} - X_{C(n-1)}|_{max} + |X_{Cn} - X_{C(n-)}|_{submax}$$

These evaluation values $S'_1$, $S'_2$ are the same evaluation values as the case of conventional defocused image detection.

FIG. 6 shows a relation between the shifted position of the lens 21 and evaluation values $S'_1$, $S'_2$ and $S_3$. As seen from FIG. 6, evaluation value $S_3$ represents the shifted direction over very wide range, the evaluation value $S'_1$ has peak value at the position in which evaluation value $S_3$ becomes zero and evaluation values $S'_1$ and $S'_2$ become equal to each other at the in-focused position f. If a proper threshold value Sth is set to the evaluation value $S_3$, therefore, a very narrow range $Sth \leq S_3 \leq 0$ including in-focused position f can be limited so that in the range of $S_3 < Sth$ or $S_3 > 0$, the case $S_3 < Sth$ is detected as front focus, and the case $S_3 > 0$ is detected as rear focus by utilizing the evaluation value $S_3$ as a defocused direction signal, and in the range of $Sth \leq S_3 \leq 0$ the case $S'_1 < S'_2$ is detected as front focus, the case $S'_1 > S'_2$ is detected as rear focus, and the case $S'_1 = S'_2$ is detected as in-focused condition by comparing evaluation values $S'_1$ and $S'_2$, thereby detecting focus conditions over very wide range and detecting in-focused position f with high precision.

Figure 7:
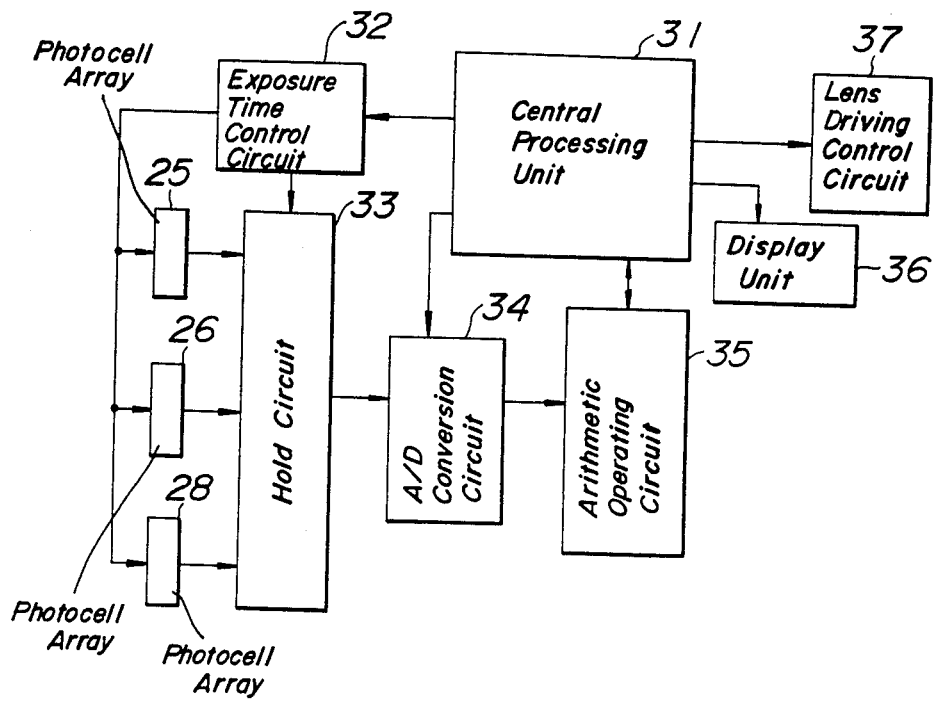
FIG. 7 is a block diagram showing a signal treating means of the focus condition detecting device according to the present invention.

FIG. 7 is a block diagram showing one embodiment of a signal treating system of the focus condition detecting device according to the present invention. In this embodiment, a central processing unit 31 starts an exposure time control circuit 32 thereby starting exposure of photocell arrays 25, 26 and 28. At the time that outputs of respective photocell arrays 25, 26 and 28 reach a predetermined value, the exposure time control circuit 32 generates and supplies a control signal to a hold circuit 33 thereby holding outputs of respective photocell elements in the photocell arrays 25, 26 and 28. Next, the central processing unit 31 starts an A/D conversion circuit 34 for A/D-converting outputs $X_{An}$, $X_{Bn}$ and $X_{Cn}$ of photocell arrays which are held in the hold circuit 33 and supplies the A/D converted outputs to an arithmetic operating circuit 35, in which the following operation is performed by using outputs $X_{An}$ and $X_{Bn}$, the calculated result being supplied to the central processing unit 31:

$$S_3 = S'_3 - S''_3 = \sum_{n=2}^{N} |X_{An} - X_{B(n-1)}| - \sum_{n=1}^{N-1} |X_{An} - X_{B(n+1)}|$$

The central processing unit 31 compares the operated signal $S_3$ with threshold value Sth thereby detecting the conditions $S_3 < Sth$, $Sth \leq S_3 \leq 0$ and $S_3 > 0$ resulting in a decision of rear focus in the case of $S_3 > 0$, and front focus in the case of $S_3 < Sth$, so that the unit 31 generates decision signals in accordance with respective cases and supplies these signals to a display unit 36 by which decided focus conditions are displayed. At the same time the decision signals are supplied to a lens driving control circuit 37 which shifts or moves the lens 21 in the required direction through a lens drive device (not shown). When the condition $Sth \leq S_3 \leq 0$ is detected, the unit 31 again supplies an instruction signal to the operating circuit 35, by which a calculation shown by the following formula is performed:

$$S'_1 = |X_{An} - X_{A(n-1)}|_{max} + |X_{An} - X_{A(n-1)}|_{submax}$$

$$S'_2 = |X_{Cn} - X_{C(n-1)}|_{max} + |X_{Cn} - X_{C(n-1)}|_{submax}$$

From the calculated result the unit 31 decides the front focus in the case of $S'_1 < S'_2$, the rear focus in the case of $S'_1 > S'_2$ and the in-focused condition in the case of $S'_1 \approx S'_2$, thereby generating decision signals according to respective cases or conditions resulting in an indication of decided conditions in the display unit 36. At the same time, the decision signals are supplied to the lens driving control circuit 37 thereby shifting or moving the lens 21 in the required direction through the lens drive means without the condition $S'_1 \approx S'_2$ resulting in a detection of automatic focus conditions.

Figure 8:
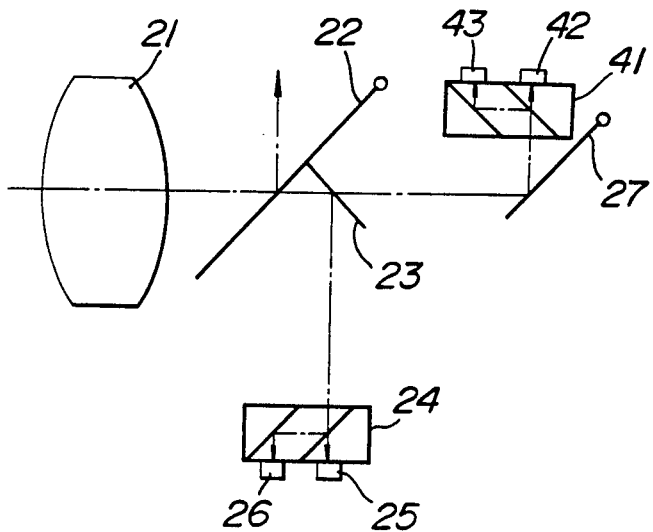
FIG. 8 is a schematic diagram showing construction of another embodiment of an optical system of a device for carrying out a method of detecting focus conditions according to the present invention.
Figure 9:
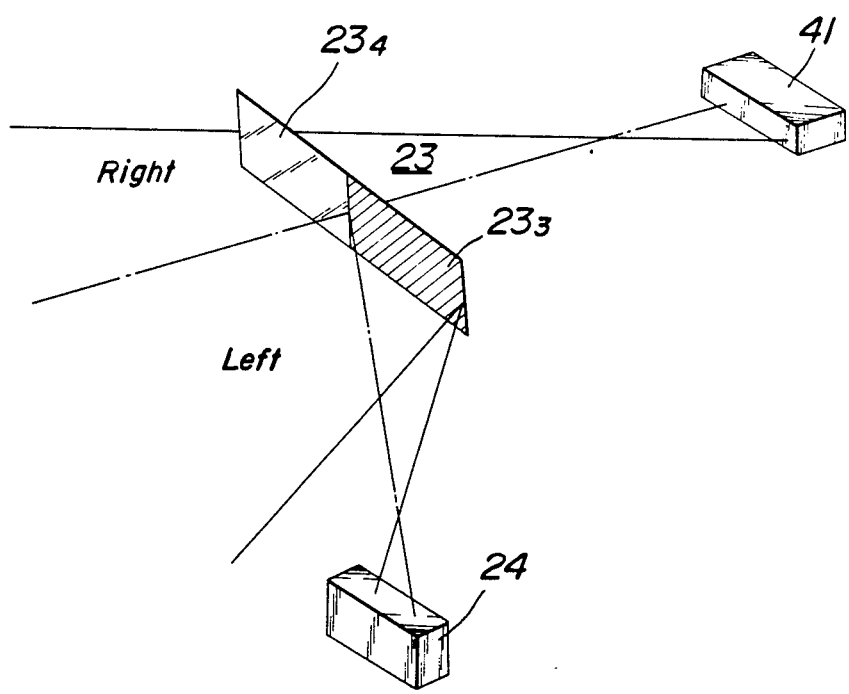
FIG. 9 is a perspective view showing a positional relation of an optical element for a wavefront splitter.

FIG. 8 shows another embodiment of the device for detecting focus conditions according to the present invention which is applied to a single-lens reflex camera.

In this embodiment, the construction of the device is similar to that of the device shown in FIG. 3 except that the photocell array 28 is replaced by a light receiving means comprising a beam splitter 41 and photocell arrays 42 and 43. Photocell arrays 25 and 26 as well as 42 and 43 are placed in the front and the rear of a surface conjugated to the predetermined focal plane of the optical system. Like reference numerals shown in FIG. 3 designate like or functionally equivalent parts.

In such a construction described above, the light beam passing through the lens 21 is divided by the quick return mirror 22 into two parts. One of the divided beams is led to a finder system (not shown). The other of the divided beams is led onto the wavefront splitting element 23, in which the wavefront thereof is divided by its transparent part 23-4 and its total reflection part 23-3. The light beam transmitted through the transparent part 23-4 is led onto the photocell arrays 42 and 43 through the beam splitter 41, respectively. The light beam reflected by the total reflection part 23-3 is led onto the photocell arrays 25 and 26 through the beam splitter 24, respectively.

Photocell arrays 25 and 42 as well as 26 and 43 are arranged at surfaces conjugated to each other so that due to the horizontal shift of an image by wavefront splitting, the position of the image formed by light beams incident on the photocell arrays 25 and 42 from the lens 21 is shifted in accordance with front focus or rear focus until the lens 21 has in-focused condition to photocell arrays 25 and 42, and is not shifted in the case of the in-focused condition. For the photoelectrically converted output of photocell arrays 25 and 42, as shown in FIG. 5a the output pattern A of photocell array 25 is shifted to the right side and the output pattern B of photocell array 42 is shifted to the left side when the focused position of the lens 21 is placed behind the photocell arrays 25 and 42. As shown in FIG. 5b, phases of respective output patterns of respective photocell arrays 25 and 42 coincide with each other when the focused position is placed on photocell arrays 25 and 42. As shown in FIG. 5c, the shifted direction of outputs A and B of photocell arrays 25 and 42 is reversed to the case shown in FIG. 5a when the focused position is placed in front of photocell arrays 25 and 42.

Figure 10:
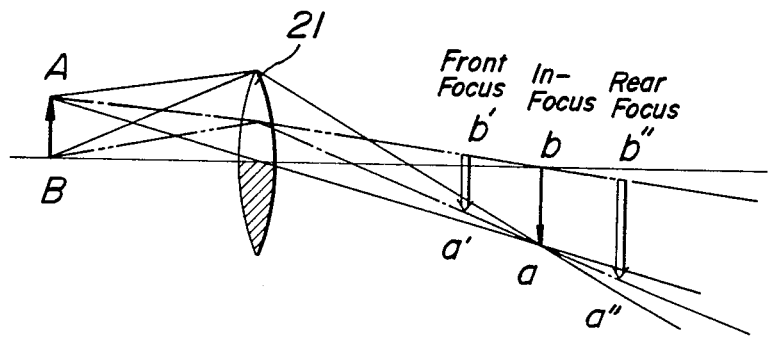
FIG. 10 is a schematic diagram for explaining the horizontal shifting effect of an image obtained by wavefront splitting.

It is well known to shift images horizontally by wavefront division. FIG. 10 shows a principle of such a horizontal shifting effect. Under the condition that the lower half of the lens 21 is shielded as shown by hatched portion, the center beam of a light beam passing through the lens 21 from the object A is passed through respective points a', a, a". The center beam of a light beam from the object B is passed through respective points b', b, b". Therefore, the objective images in respective conditions such as the in-focus, the front focus and the rear focus are formed at positions of a-b, a'-b' and a"-b" so that for the in-focus image a-b, the image is shifted upper side in the case of front focus and shifted lower side in the case of rear focus.

The analysis of the evaluation value $S_3 = S'_3 - S''_3$ for the photocell arrays 25 and 42 is the same as that of the first embodiment so that its explanation is omitted.

The analysis of the evaluation value $S_4 = S'_4 - S''_4$ for the photocell arrays 26 and 43 is similar to that of evaluation value $S_3 = S'_3 - S''_3$ so that its explanation is also omitted.

Figure 11:
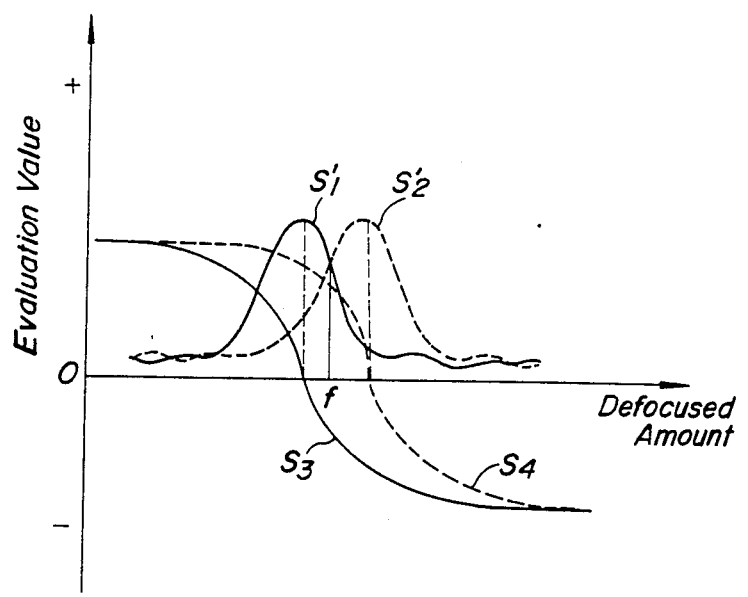
FIG. 11 is a graph showing a relation of evaluation value to defocused amount explaining the principle of focus condition detection according to the present invention.

The relation of evaluation values $S'_1$, $S'_2$ and $S_3$, $S_4$ obtained in this embodiment is shown in FIG. 11. That is, when the defocused position represented by evaluation value $S_3$, obtained by comparing outputs of photocell arrays 25 and 42, becomes zero, it coincides with the peak position of the evaluation value $S'_1$. When the defocused position represented by evaluation value $S_4$, obtained by comparing outputs of photocell arrays 26 and 43, becomes zero, it coincides with the peak position of the evaluation value $S'_2$.

Photocell arrays 25 and 26 are arranged at the symmetrical position in the front and the rear of a surface conjugated to the predetermined focal plane (film plane) of the lens 21 so that the crossing point f of the evaluation value $S'_1$ obtained from the output of photocell array 25 and the evaluation value $S'_2$ obtained from the output of photocell array 26 is detected as an in-focus position. In the defocused region where both evaluation values $S_3$ and $S_4$ are positive or negative, the sign of positive or negative is used as a shifted focus signal thereby deciding rear focus condition in the case of positive sign and front focus condition in the case of negative sign.

In the region that the signs of evaluation values $S_3$ and $S_4$ are different with each other, the evaluation values $S'_1$ and $S'_2$ are calculated according to the previously described equation in the same manner as the conventional one thereby deciding focus shift direction in accordance with magnitude relation thereof. That is, front focus is detected in the case of $S'_1 < S'_2$, rear focus is detected in the case of $S'_1 > S'_2$, and the in-focus condition is detected in the case of $S'_1 = S'_2$ so that it is possible to detect the in-focus condition over wide defocus range which is difficult to detect by the conventional focus condition detecting device.

Figure 12:
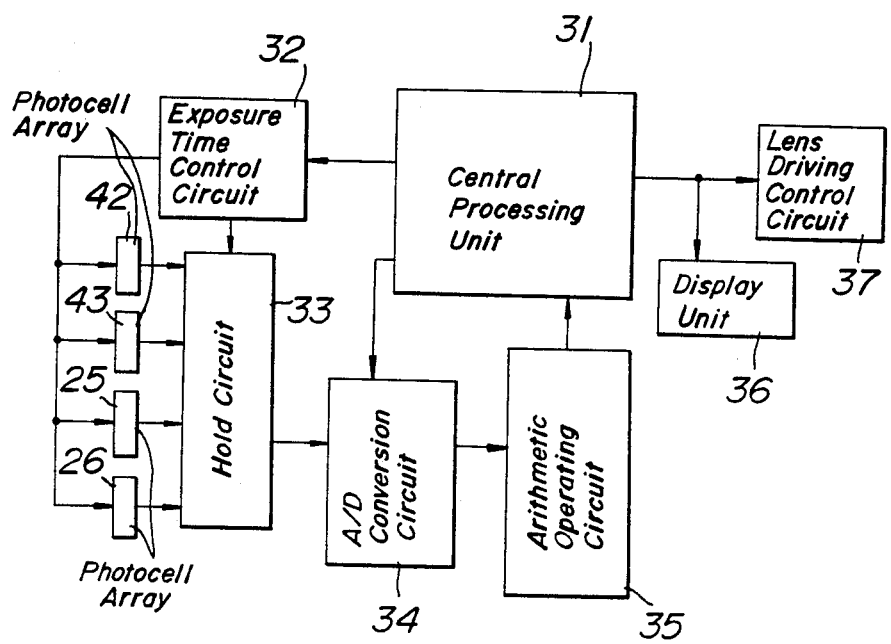
FIG. 12 is a block diagram showing another signal treating means of the focus condition detecting device according to the present invention.

FIG. 12 shows another embodiment of the signal treating system for carrying out another method according to the present invention. In this embodiment the construction of the signal treating system is similar to that of the signal treating system shown in FIG. 7 except that four photocell arrays 25, 26, 42 and 43 are used instead of three photocell arrays so that its constructional explanation is omitted.

In this embodiment the central processing unit 31 starts the A/D conversion circuit 34 thereby A/D-converting the output $X_{Bn}$ of the photocell array 42, the output $X_{B'n}$ of the photocell array 43, the output $X_{An}$ of the photocell array 25 and the output $X_{Cn}$ of the photocell array 26 which are held in the hold circuit 33. The A/D converted outputs are supplied to the arithmetic operating circuit 35 in which these outputs are arithmetically operated upon in accordance with the following equations:

$$S_3 = S'_3 - S''_3 = \sum_{n=2}^{N} |X_{An} - X_{B(n-1)}| - \sum_{n=1}^{N-1} |X_{An} - X_{B(n-1)}|$$

and $$S_4 = S'_4 - S''_4 = \sum_{n=2}^{N} |X_{Cn} - X_{B'(n-1)}| - \sum_{n=1}^{N-1} |X_{Cn} - X_{B'(n+1)}|$$

The operated results are supplied to the central processing unit 31. The unit 31 decides front focus in the case of $S_3 < 0$, $S_4 < 0$, and rear focus in the case of $S_3 > 0$, $S_4 > 0$, thereby indicating these results by the display unit 36 and supplying control signals to the lens driving control circuit 37 resulting in control of lens drive means (not shown).

In the case of $S_3 \times S_4 < 0$, the central processing unit 31 supplies an instruction to the arithmetic operating circuit 35 thereby calculating evaluation values $S'_1$ and $S'_2$ representing sharpness of image by using outputs of photocell arrays 25 and 26 resulting in a decision of front focus in the case of $S'_1 < S'_2$, rear focus in the case of $S'_1 > S'_2$, and in-focus in the case of $S'_1 = S'_2$. The decided results are indicated by the display unit 36 and supplied to the lens driving control circuit 37 in the case of $S'_1 < S'_2$ or $S'_1 > S'_2$ thereby controlling the lens drive means so as to obtain the condition $S'_1 = S'_2$.

The present invention is not limited to the above mentioned embodiments only, but various changes and alternatives are possible. For example, in the above first embodiment the threshold value Sth is set and in the case of Sth $\leq S_3 \leq 0$ the focus conditions are detected by using evaluation values $S'_1$ and $S'_2$, but when $S_3 = 0$ or the evaluation value $S_3$ enters in a predetermined range about zero the focus conditions may also be detected by using evaluation values $S'_1$ and $S'_2$. Additionally, the above described embodiment utilizes the wavefront splitting element shown in FIGS. 4a, 4b, but the wavefront splitting may be performed by receiving by the photocell array 28, directly from the quick return mirror 22, a light beam from a different region of mirror 22 than the light beam leading to light beam splitter 24.

What is claimed is:

1. A method of detecting focus conditions comprising dividing the wavefront of a light beam from a photographic optical system in an image space thereof into two light beam parts, one being a first beam part passed through a first portion of an objective lens, and the other being a second beam part passed through a second portion of the objective lens, providing first light receiving means to receive the first beam part and including a photocell array in each of the front and the rear of a surface coupled with a predetermined focal plane of the optical system, providing second light receiving means to receive the second beam part and including at least one photocell array at a surface coupled with one of the photocell arrays in the first light receiving means, detecting a first signal representing horizontal shift of an image based on outputs of at least one photocell array in the second light receiving means and one photocell array in the first light receiving means which is coupled with the at least one photocell array in the second light receiving means, and detecting a second signal representing defocused amount of the image based on outputs of two photocell arrays in the first light receiving means, whereby focus conditions of the optical system are detected by the first and the second signals.

2. A method of detecting focus conditions as claimed in claim 1, wherein an evaluation value obtained by comparing outputs of at least one photocell array in the second light receiving means and one photocell array in the first light receiving means which is coupled with the at least one photocell array in the second light receiving means is referred to as $S_3$, provided that the evaluation value $S_3$ has the relation $S_3 = S'_3 - S''_3$, where $$S'_3 = \sum_{n=2}^{N} |X_{An} - X_{B(n-1)}|, \quad S''_3 = \sum_{n=1}^{N-1} |X_{An} - X_{B(n+1)}|,$$

N is the number of light receiving elements in one photocell array, $X_{An}$ is the nth output of one photocell array in the first light receiving means, and $X_{Bn}$ is the nth output of one photocell array in the second light receiving means, the first direction of horizontal shift in the optical system being detected in the case of $S_3 = S'_3 - S''_3 < 0$ and the second direction of horizontal shift being detected in the case of $S_3 = S'_3 - S''_3 > 0$.

3. A method of detecting focus conditions as claimed in claim 2, wherein a reference value Sth is set in the evaluation value $S_3$, and when $Sth \leq S_3 \leq 0$ an in-focused point is detected by the second signal.

4. A method of detecting focus conditions as claimed in claim 3, wherein in the case of the condition Sth $S_3$O, the following evaluation values are defined:

$$S'_1 = |X_{AN} - X_{A(n-1)}|_{max} + |X_{An} - X_{A(n-1)}|_{sub-max}$$

$$S'_2 = |X_{Cn} - X_{C(n-1)}|_{max} + |X_{Cn} - X_{C(n-1)}|_{sub-max}$$

where $X_{An}$ is the nth output of one photocell array in the first light receiving means and $X_{Cn}$ is the nth output of the other photocell array in the first light receiving means, and evaluation values $S'_1$ and $S'_2$ are compared with each other thereby obtaining a front focus condition in the case of $S'_1 < S'_2$, a rear focus condition in the case of $S'_1 > S'_2$ and an in-focused condition in the case of $S'_1 \approx S'_2$, respectively.

5. A method of detecting focus conditions as claimed in claim 1, wherein evaluation values obtained from the output of one photocell array and the other photocell array in the first light receiving means, an evaluation value obtained by the comparison of one photocell array in each of the first and the second light receiving means, and an evaluation value obtained by the comparison of a second photocell array in each of the first and the second light receiving means are referred to as $S'_1$, $S'_2$, $S_3$ and $S_4$, respectively, and the sign of the values $S_3$ and $S_4$ determines the direction of horizontal shift in the optical system.

6. A method of detecting focus conditions as claimed in claim 5, wherein a rear focus condition is detected by the condition of $S_3 > 0$ or $S_4 >$ , and a front focus condition is detected by the condition of $S_3 < 0$ or $S_4 < 0$.

7. A method of detecting focus conditions as claimed in claim 5, wherein in the case of $S_3 > 0$ and $S_4 < 0$ or $S_3 < 0$ and $S_4 > 0$, an in-focused condition is detected by the magnitudinal relation of $S'_1$ and $S'_2$.

8. A method of detecting focus conditions as claimed in claim 7, wherein a front focus condition is detected by the condition of $S'_1 < S'_2$, the rear focus condition is detected by the condition of $S'_1 > S'_2$, and an in-focused condition is detected by the condition of $S'_1 \approx S'_2$.

9. A device for detecting focus conditions comprising means for dividing the wavefront of a light beam from a photographic optical system in an image space thereof into two light beam parts, one being a first beam part passed through a first portion of an objective lens, and the other being a second beam part passed through a second portion of the objective lens, first light receiving means to receive the first beam part and including a photocell array provided in each of the front and the rear of a surface coupled with a predetermined focal plane of the optical system, second light receiving means to receive the second beam part and including at least one photocell array provided at a surface coupled with one of the photocell arrays in the first light receiving means, and means for detecting and treating a first signal representing horizontal shift of an image and a second signal representing defocused amount of the image based on outputs of proper combinations of photocell arrays in the first and second light receiving means, whereby focus conditions of the optical system are detected by the first and the second signals.

10. A device for detecting focus conditions as claimed in claim 9, wherein the wavefront dividing means comprises a glass plate and a total reflection film provided on the surface of the glass plate over a half region thereof thereby forming a reflection part and a transparent part.

11. A device for detecting focus conditions as claimed in claim 9, wherein a light beam splitter is provided between the wavefront dividing means and the first light receiving means.

* * * * *